US010147002B2

United States Patent
Hartmann et al.

(10) Patent No.: US 10,147,002 B2
(45) Date of Patent: Dec. 4, 2018

(54) METHOD AND APPARATUS FOR DETERMINING A ROAD CONDITION

(71) Applicants: Conti Temic microelectronic GmbH, Nuremberg (DE); Continental Teves AG & Co. oHG, Frankfurt (DE)

(72) Inventors: Bernd Hartmann, Bad Homburg (DE); Dieter Kroekel, Eriskirch (DE); Stefan Fritz, Erzhausen (DE); Joachim Denzler, Jena (DE); Bjoern Froehlich, Boeblingen (DE); Michael Kemmler, Jena (DE); Stefan Schubert, Friedrichsdorf (DE); Eric Bach, Cottbus (DE)

(73) Assignees: Conti Temic microelectronic GmbH, Nuremberg (DE); Continental Teves AG & Co. OHG, Frankfurt am Main (DE)

(*) Notice: Subject to any disclaimer, the term of this patent is extended or adjusted under 35 U.S.C. 154(b) by 278 days.

(21) Appl. No.: 14/764,782

(22) PCT Filed: Feb. 14, 2014

(86) PCT No.: PCT/DE2014/200062
§ 371 (c)(1),
(2) Date: Jul. 30, 2015

(87) PCT Pub. No.: WO2014/127777
PCT Pub. Date: Aug. 28, 2014

(65) Prior Publication Data
US 2015/0371095 A1    Dec. 24, 2015

(30) Foreign Application Priority Data
Feb. 19, 2013    (DE) .................. 10 2013 101 639

(51) Int. Cl.
H04N 7/18    (2006.01)
G06K 9/00    (2006.01)
(Continued)

(52) U.S. Cl.
CPC ............ *G06K 9/00798* (2013.01); *B60R 1/00* (2013.01); *G06K 9/00476* (2013.01);
(Continued)

(58) Field of Classification Search
CPC ........... G06K 9/00798; G06K 9/00476; G06K 9/00791; G06K 9/46; G06K 9/4652;
(Continued)

(56) References Cited

U.S. PATENT DOCUMENTS 4,712,635 A    12/1987 Sumiya et al.
5,586,028 A *  12/1996 Sekine ................ B60T 8/17636
                                                            701/1
(Continued)

FOREIGN PATENT DOCUMENTS

DE    198 56 510    9/1999
DE    198 54 964    6/2000
(Continued)

OTHER PUBLICATIONS

International Search Report of the International Searching Authority for International Application PCT/DE2014/200062, dated Oct. 24, 2014, 4 pages, European Patent Office, HV Rijswijk, Netherlands.
(Continued)

*Primary Examiner* — Y Lee
*Assistant Examiner* — Richard B Carter
(74) *Attorney, Agent, or Firm* — W. F. Fasse (57) ABSTRACT

A method and an apparatus determine a road condition using a vehicle camera. At least one image is acquired using the camera. A first image area that includes an image of the road surface is determined in the at least one image. A classifier
(Continued)

assigns the first image area to at least one class (among pre-established classes) that represents a specific road condition of the road surface. Information regarding this specific road condition is output.

20 Claims, 6 Drawing Sheets (51) Int. Cl.
*B60R 1/00* (2006.01)
*G06K 9/46* (2006.01)
*G06K 9/52* (2006.01)
*G06K 9/62* (2006.01)
*G06T 3/40* (2006.01)
*H04N 5/232* (2006.01)
*G06T 7/11* (2017.01)

(52) U.S. Cl.
CPC ........... *G06K 9/00791* (2013.01); *G06K 9/46* (2013.01); *G06K 9/4652* (2013.01); *G06K 9/52* (2013.01); *G06K 9/6215* (2013.01); *G06K 9/6267* (2013.01); *G06T 3/40* (2013.01); *G06T 7/11* (2017.01); *H04N 5/23293* (2013.01); *G06K 2009/4666* (2013.01)

(58) Field of Classification Search
CPC ...... G06K 9/52; G06K 9/6215; G06K 9/6267; G06T 7/11; G06T 3/40; B60R 1/00; H04N 5/23293; H04N 13/02
USPC ........... 348/148; 381/56; 382/108; 701/1, 37
See application file for complete search history.

(56) References Cited

U.S. PATENT DOCUMENTS

| | | | |
|---|---|---|---|
| 5,774,821 | A | 6/1998 | Eckert |
| 5,963,148 | A | 10/1999 | Sekine et al. |
| 6,636,258 | B2 | 10/2003 | Strumolo |
| 6,807,473 | B1 | 10/2004 | Tran |
| 8,180,527 | B2 | 5/2012 | Mueller-Schneiders et al. |
| 8,306,747 | B1 | 11/2012 | Gagarin et al. |
| 8,957,949 | B2 | 2/2015 | Randler et al. |
| 2002/0007661 | A1 | 1/2002 | Takahashi |
| 2003/0101805 | A1 | 6/2003 | Raab |
| 2004/0016870 | A1 | 1/2004 | Pawlicki et al. |
| 2005/0085987 | A1 | 4/2005 | Yokota et al. |
| 2007/0050121 | A1 | 3/2007 | Ammon et al. |
| 2008/0027607 | A1 | 1/2008 | Ertl et al. |
| 2010/0253541 | A1 | 10/2010 | Seder et al. |
| 2011/0200199 | A1* | 8/2011 | Wakao ............... B60T 8/172 381/56 |
| 2011/0245995 | A1 | 10/2011 | Schwarz |
| 2012/0029783 | A1 | 2/2012 | Takenaka et al. |
| 2012/0078483 | A1 | 3/2012 | Yajima et al. |
| 2012/0167663 | A1 | 7/2012 | Groitzsch et al. |
| 2012/0323444 | A1 | 12/2012 | Rieger et al. |
| 2013/0033603 | A1* | 2/2013 | Suzuki ............... G08G 1/04 348/148 |
| 2013/0332028 | A1 | 12/2013 | Heger et al. |
| 2014/0052325 | A1 | 2/2014 | Naegele et al. |
| 2014/0195112 | A1* | 7/2014 | Lu ................ B60G 17/015 701/37 |
| 2014/0347448 | A1 | 11/2014 | Hegemann et al. |
| 2015/0166072 | A1 | 6/2015 | Powers et al. |
| 2015/0178572 | A1* | 6/2015 | Omer ............... G08G 1/0112 382/108 |
| 2015/0224925 | A1 | 8/2015 | Hartmann |
| 2015/0251659 | A1 | 9/2015 | Fischer et al. |
| 2015/0344037 | A1 | 12/2015 | Siegel et al. |
| 2016/0121902 | A1 | 5/2016 | Huntzicker et al. |
| 2016/0379065 | A1 | 12/2016 | Hartmann |

FOREIGN PATENT DOCUMENTS

| | | |
|---|---|---|
| DE | 101 55 488 | 5/2003 |
| DE | 102 56 726 | 6/2004 |
| DE | 102004018088 | 2/2005 |
| DE | 102004055069 | 2/2006 |
| DE | 102004047914 | 3/2006 |
| DE | 102004048637 | 4/2006 |
| DE | 102006012289 | 9/2007 |
| DE | 102008047750 | 5/2009 |
| DE | 102010013339 | 1/2011 |
| DE | 102009041566 | 3/2011 |
| DE | 102011100907 | 1/2012 |
| DE | 102010045162 | 3/2012 |
| DE | 102011081362 | 2/2013 |
| EP | 0 412 791 | 2/1991 |
| EP | 0 827 127 | 3/1998 |
| EP | 1 201 521 | 5/2002 |
| EP | 2 521 111 | 11/2012 |
| JP | 07-035522 A | 2/1995 |
| JP | 2005-226671 A | 8/2005 |
| KR | 1020110032422 | 3/2011 |
| WO | WO 2012/110030 | 8/2012 |
| WO | WO 2013/009697 | 1/2013 |

OTHER PUBLICATIONS

PCT International Preliminary Report on Patentability including English Translation of PCT Written Opinion of the International Searching Authority for International Application PCT/DE2014/200062, dated Aug. 25, 2015, 18 pages, International Bureau of WIPO, Geneva, Switzerland.

German Search Report for German Patent Application No. 10 2013 101 639.1, dated Jan. 10, 2014, 5 pages, Muenchen, Germany, with English translation, 5 pages.

Ragib Omer, "An Automatic Image Recognition System for Winter Road Surface Condition Monitoring", Master's Thesis, University of Waterloo, Ontario, Canada, Feb. 22, 2011, pp. i-xii, 1 to 68 retrieved at https://uwspace.uwaterloo.ca/handle/10012/5799.

Maria Jokela et al., "Road Condition Monitoring System Based on a Stereo Camera", Intelligent Computer Communication and Processing, IEEE 5th International Conference ICCP 2009, Piscataway, NJ, USA, Aug. 27, 2009, XP031545069, pp. 423 to 428.

J. Chetan et al., "An Adaptive Outdoor Terrain Classification Methodology Using Monocular Camera", Intelligent Robots and Systems, IEEE International Conference IROS 2010, Piscataway, NJ, USA, Oct. 18, 2010, XP031920567, pp. 766 to 771.

J. H. Choi et al., "Road Identification in Monocular Color Images Using Random Forest and Color Correlogram", International Journal of Automotive Technology, vol. 13, No. 6, The Korean Society of Automotive Engineers, Heidelberg, Oct. 2, 2012, X2035120063, pp. 941 to 948.

Raqib Omer et al., "An Automatic Image Recognition System for Winter Road Surface Condition Classification", Intelligent Transportation Systems, 13th International IEEE Conference ITSC 2010, Piscataway, NJ, USA, Sep. 19, 2010, XP031792816, pp. 1375 to 1379.

T. Teshima et al., "Detection of the Wet Area of the Road Surface Based on a Saturated Reflection", Meeting on Image Recognition and Understanding, 2007, XP002730931, pp. 1218 to 1223, retrieved at http://hvrl.ics.keio.ac.jp/paper/pdf/domestic_Conference/2007/MIRU2007_teshima.pdf.

Ernst Dieter Dickmanns et al., "Dynamic Monocular Machine Vision", Machine Vision and Applications, 1988 Springer-Verlag New York Inc., pp. 223 to 240.

* cited by examiner

METHOD AND APPARATUS FOR DETERMINING A ROAD CONDITION

FIELD OF THE INVENTION

This invention relates to a method and apparatus for determining a road condition using a vehicle camera.

BACKGROUND INFORMATION

Technological progress in the field of optical image acquisition allows the use of camera-based driver assistance systems which are located behind the windshield and capture the area in front of the vehicle in the way the driver perceives it. The functionality of these assistance systems ranges from automatic headlights to the detection and display of speed limits, lane departure warnings, and imminent collision warnings.

Starting from just picking up the area in front of the vehicle to a full 360° panoramic view, cameras can be found in various applications and different functions for driver assistance systems in modern vehicles. It is the primary task of digital camera image processing as an independent source of sensor data or in conjunction with laser or lidar sensor data to detect, classify, and track objects in the image area. Classic objects typically include various vehicles such as cars, trucks, two-wheel vehicles, or pedestrians. In addition, cameras detect traffic signs, lane markings, guardrails, free spaces, or other generic objects.

Automatic learning and detection of object categories and their instances is one of the most important tasks of digital image processing and represents the current state of the art.

Modern driver assistance systems use various sensors including video cameras to capture the area in front of the car as accurately and robustly as possible. This environmental information, together with driving dynamics information from the vehicle (e.g. from inertia sensors) provide a good impression of the current driving state of the vehicle and the entire driving situation. This information can be used to derive the criticality of driving situations and to initiate the respective driver information/alerts or driving dynamic interventions through the brake and steering system.

Since the actually available friction coefficient or equivalent information about the current road condition is typically not provided or cannot be measured or determined in driver assistance systems that are ready for series production, the times for issuing an alert or for intervention are in principle determined based on a dry road with a high adhesion coefficient between the tire and the road surface.

This results in the following fundamental problem. Accident-preventing or at least impact-weakening systems warn the driver or intervene so late that accidents are prevented or accident impacts acceptably weakened only if the road is really dry. But the effect of driver dynamic interventions via the brake and steering system is critically dependent on the friction coefficient of the ground. Moisture, snow, and ice reduce the coefficient of friction available between the tire and the road considerably compared to a dry road. If the road provides less adhesion due to moisture, snow, or even ice, an accident can no longer be prevented and the reduction of the impact of the accident does not have the desired effect.

A known approach to counteracting this fundamental problem is to evaluate camera images for the purpose of estimating road conditions and for deriving estimated friction coefficients.

Document DE 10 2004 018 088 A1 discloses a road recognition system having a temperature sensor, an ultrasound sensor, and a camera. The temperature, roughness, and image data (road data) obtained from the sensors is filtered and compared to reference data, and a margin of safety is created for the comparison. The condition of the road surface is determined based on the comparison of the filtered road data with the reference data. The road surface (e.g. concrete, asphalt, dirt, grass, sand, or gravel) and its condition (e.g. dry, icy, snow-covered, wet) can be classified in this way.

Document WO 2012/110030 A2 discloses a method and apparatus for estimating the friction coefficient using a 3D camera, such as a stereo camera. At least one image of the vehicle environment is taken using the 3D camera. A height profile of the road surface is created in the entire area in front of the vehicle from the image data of the 3-D camera. The anticipated local coefficient of friction of the road surface in the area in front of the vehicle is estimated from the height profile. In individual cases, classification of the road surface as snow cover or a muddy dirt road can be based on specially determined elevation profiles.

However, the known methods make high demands on the required sensors. The methods or apparatuses mentioned require a temperature and an ultrasound sensor in addition to a camera, or a camera that is configured as a 3D sensor, to obtain sufficiently robust classification results.

SUMMARY OF THE INVENTION

In view of the above, it is an object of at least one embodiment of the present invention to provide a road condition detection system using a camera which ensures reliable and robust proactive road condition detection or the coefficient of friction estimation derived from it, respectively, using (only) a single mono camera.

The following considerations outline the starting point of the solution according to the invention:

Algorithms of digital image processing linked with intelligent adjustment and alignment of the image area or ROI (region of interest) that is relevant for processing to the respective driving situation is to ensure that the image area analyzed contains the road surface for the purpose of determining the road condition.

A central idea of the invention, from the point of view of digital image processing, is the calculation of local and global features from the image area (ROI), the appropriate combination of various features within an image area or from different image areas, and the subsequent decision by a classifier that can be trained using sample data, the findings of which from various time periods result in a decision about the road condition. The technological advantage lies in more efficient processing of the camera image due to simple operations and in achieving a high quality through the combination of various features.

A method according to the invention for determining a road condition using a vehicle camera includes the following steps:
  at least one image is taken using the vehicle camera;
  a first area that includes a depiction of the road surface is determined in the image taken;
  said first image area is fed to a classifier, wherein the classifier assigns at least one class to said first image area that represents a specific road condition; and
  information is output with respect to this at least one road condition.

The vehicle camera captures an environment outside the vehicle; in particular, the camera may be directed toward the front and disposed behind the windshield near the interior rear view mirror.

The first image area that is determined for detecting the road condition may also be called a region of interest (ROI) and include the entire image or a section thereof. The image area may for example be a simple rectangle, a region of an undefined shape, or even a single pixel. Determination of the image section that is relevant for further image processing is particularly important to ensure that the analyzed first image area includes the road surface, allowing to determine the road condition from said first image area.

A classifier (or classification system) assigns at least one of the predetermined classes of road conditions to the first image area. These classes preferably are "wet road", "dry road", "snow-covered road", and "icy road". The classifier may in particular have been trained using sample data. Based on learned assignments of sample image areas to known road conditions, the trained classifier can assign as yet unknown image contents or areas to at least one class.

Information is output about the at least one road condition, preferably to other driver assistance functions, vehicle functions, or to the driver.

The information output for the determined road condition may in particular be an estimate of the coefficient of friction for the road section depicted in the image area. The friction coefficient, also called coefficient of friction, adhesion coefficient, or friction factor, indicates the maximum force in relation to the wheel load that can be transmitted between a road surface and a vehicle tire (e. g. in the tangential direction) and is therefore an essential parameter of the road condition. In addition to the road condition, tire properties are required for a complete determination of the friction coefficient. It is typically just road condition information that is considered for an estimate of the friction coefficient from camera image data, since tire properties generally cannot be detected from camera image data.

The method according to the invention for determining the road condition ensures a very robust, reliable, and proactive detection of the spatially resolved road condition. Automatic capture of road condition data is a key element on the road towards highly automated or autonomous driving in the future.

In an advantageous embodiment, at least one feature is extracted from the first image area and fed to the classifier. The feature(s) is/are particularly suited for detecting the different appearance of the pavement in the camera image depending on the road condition.

Several individual features may form a feature vector that combines various data from the first image area to be able to make a more robust and accurate decision about the road condition in the classification step. Various feature types for an image area make up a set of feature vectors. The set of feature vectors obtained in this way for one image area is called the feature descriptor. Where multiple image areas are used, the feature descriptor may also be composed or combined of combined features of the various image areas. The feature descriptor can be assembled by simple concatenation, a weighted combination, or other non-linear representations. Not only various image areas at one point in time in an image but across several points in time in subsequent images of a series of images may be used. The feature descriptor is then assigned to at least one class by a classification system (classifier). A classifier in this case is a mapping of the feature descriptor on a discrete number that identifies the classes to be detected.

The feature that is extracted from the first image area and fed to the classifier preferably includes the mean gray scale value or mean color value (RGB) of the first image area. The "mean RGB color value" feature type includes three individual features or feature values, namely R, G, and B (red, green, and blue value), which can be combined into a feature vector.

But any other information that can be extracted from a ROI or from pixels of the ROI and from which differences between the predetermined classes can be determined is suitable.

Preferably, HSI values (hue, saturation, intensity) averaged as feature types across the first image area or L*a*b* values (CIELAB color space) or gradient values can be extracted as features. The feature vectors for single or multiple feature types that are extracted from one or more ROIs of an image form the feature descriptor.

Advantageously, the at least one feature that is extracted from the first image area and fed to the classifier includes the result(s) of a pixel-by-pixel segmentation within the first image area. Special regions can be localized with pin-point accuracy within an image area. This is an advantage for detecting local differences, such as for detecting puddles, drying lanes on a wet road, or icy lanes on snow-covered roads. This increases the quality of detection for these conditions. Pinpoint accurate classification may for example be achieved using semantic segmentation method in which each pixel in the image area is assigned a label of one of the predetermined classes. Pixel-precise classification of images adds pinpoint accurate classification to the rough localization of objects in images.

According to an advantageous embodiment, a random decision forest (or just 'random forest') is used as a classifier.

Decision trees are hierarchical classifiers which break down the classification problem in a tree-like fashion. Starting at the root, a path towards a leaf node where the final classification decision is made is followed based on previous decisions. Due to the high learning complexity, very simple classifiers, so-called 'decision stumps', which separate the input parameter space orthogonally to a coordinate axis, are preferred for the inner nodes.

Decision forests are collections of decision trees which contain randomized elements preferably at two points in the training of the decision trees. First, every tree is trained with a random selection of training data, and second, only one selection of permissible dimensions is used for each binary decision. Class histograms are stored in the leaf nodes which allow a maximum likelihood estimation with respect to the feature vectors that reach the leaf node during the training. Class histograms store the frequency with which a feature descriptor of a specific road condition reaches the respective leaf node while traveling through the decision tree. As a result, each class can preferably be assigned a probability that is calculated from the class histograms.

To make a decision about a road condition for a feature descriptor, the most probable class from the class histogram is preferably used as the current road condition. Other methods may also be used to transfer information from the decision trees into a decision about the road condition.

According to a preferred embodiment, the assignment of the first image area to at least one class by the classifier for at least one image taken is subjected to temporal filtering before the information about the at least one assigned road condition is output. The classifier assigns at least one class to an image taken or an image area thereof. An optimization step may follow this assignment or decision per image taken.

This optimization can in particular take the temporal context into account in that it functions as temporal filtering. The assignment for the current image taken is compared to road conditions assigned to previous images. In particular, the most frequent class from a previous time period can be used as reference. Individual outliers (misallocations) can be eliminated in this way.

The temporal filtering advantageously includes that the assignment of the first image area to at least one class by the classifier for at least one image currently taken is compared with an assignment based on at least one previously taken image. A change of the assigned road condition class is output only if a probability assigned to the change, which is derived from the classification of the image currently taken, exceeds a threshold value.

The temporal context is preferably taken into account by using a so-called hysteresis threshold value method. The hysteresis threshold value method uses threshold values to control the change from one road condition into another. A change is made only when the probability of the new road condition is high enough and the probability of the old road condition is accordingly low. This stabilizes the classification result and prevents permanent jumping between various road conditions.

Alternatively, or cumulatively to temporal filtering, other information from the vehicle, such as from the rain sensor or other data provided by the vehicle can be used to check the assignment by the classifier before information about the at least one assigned road condition is output.

In a preferred embodiment, the position, size, and/or shape of the first image area is adjusted to the current driving situation of one's own vehicle. Orientation (in the image currently taken) and tracking (in images subsequently taken) of at least one image area that is adjusted in shape, size, and position to the driving situation is preferably performed taking into account the movement of one's own vehicle, potential other road users, and the road conditions.

Orientation and tracking of an image area adjusted in shape, size, and position to the driving situation are in particular performed as follows:

a) The first image area is the overall camera image if the camera is exclusively directed towards the road.
b) The first image area is at least one fixed area which through adjustment and calibration of the vehicle camera is projected onto the road in front of the vehicle, preferably in a central position or in front of the left or right vehicle wheels.
c) The first image area is at least one dynamic image section which in the image is projected into the vehicle path that is calculated, inter alia, from odometry data of the vehicle and tracked dynamically.
d) The first image area is at least one dynamic image section which in the image is projected into the road/lane on/in which the vehicle is traveling and which is within two or next to one traffic lane boundary line and tracked dynamically.
e) The first image area is at least one dynamic image section which in the image is projected into the road/lane on/in which the vehicle is traveling and which is detected by means of digital image processing and tracked dynamically.
f) The first image area is at least one dynamic image section which in the image is projected into the estimated course of the road and tracked dynamically.
g) The first image area is at least one dynamic image section which in the image is projected into the trajectory calculated by the system, preferably as the center line of a predicted driving route based on a predictive trajectory planning method, and tracked dynamically.
h) The first image area is at least one dynamic image section which is projected in the direction of travel in front of the vehicle based on GPS vehicle data, preferably in accordance with the vehicle speed and heading angle (or yaw angle), and tracked dynamically.
i) The first image area is at least one dynamic image section which is projected in the direction of travel in front of the vehicle based on vehicle odometry data and tracked dynamically.
j) The first image area is at least one dynamic image section which is projected onto the road in the direction of travel in front of the vehicle based on vehicle position and map data and tracked dynamically.
k) The first image area is at least one fixed or dynamic image section which corresponds to the intersection of individual areas when at least two areas a) to j) overlap.
l) The first image area is at least a fixed or dynamic image section containing an area consisting of a) to k), wherein image segments with detected objects such as vehicles, pedestrians, or infrastructure are excluded.

Advantageously, the adjustment may be performed as a function of the speed of one's own vehicle. The position, size, and/or shape of the second image area is preferably adjusted to the speed of one's own vehicle to obtain an evenly timed prediction of the anticipated road condition. For example, the system can determine which road condition is passed over in 0.5 seconds or in one second.

The required estimation of the distance can be performed with sufficient accuracy by means of image geometry even with a mono camera if the installation height is known and a flat course of the road is assumed. When using a stereo camera, the distance can be determined more precisely by triangulation.

Advantageously, a traffic lane is detected in which the vehicle is located and the first image area is adjusted to include an image of the road surface of one's own traffic lane lying ahead.

In particular, a system for detecting traffic lane markings may be provided, and the at least one "dynamic" image area includes the road/lane on which the vehicle is traveling and which is located between two or next to one traffic lane boundary line. The size of the first image area is preferably limited in the lateral direction by traffic lane markings or boundaries. The shape of the first image area may be that of a trapezoid or a rectangle.

This image area can be projected into images taken subsequently, taking into account odometry and time information, such that this image area is tracked dynamically.

Odometry information includes information that characterizes the movement of the vehicle, in particular vehicle sensor data such as measured variables of a chassis, drive train, steering system, or navigation device of a vehicle. Together with temporal information, movement along a distance or a trajectory of the vehicle can be determined.

In a preferred embodiment, a trajectory of one's own vehicle is predicted and a vehicle path is calculated. The basis of this prediction may be data from the camera, other environmental sensors, vehicle sensors, navigation devices, telematics equipment or the like. The first image area is adjusted such that it includes an image of the road surface that is in the calculated vehicle path.

It is particularly preferred that the first image area is adjusted such that the first image area only contains an image of the road surface. Relevant in this context is everything that the tires of one's own vehicle will pass over or could pass over. Typically, the following are deemed relevant, for example: Road surface, precipitation on it, contamination (leaves, paper, sand, oil, roadkill), traffic lane markings the car passes over.

The following are typically irrelevant, for example: continuous traffic lane boundary lines, grass cover to the side of the road.

The first image area can advantageously be adjusted to exclude image segments with previously detected objects from said first image area. Previously detected objects are, in particular, other road users, such as vehicles (cars and trucks), two-wheeled vehicles, pedestrians, or infrastructure elements.

It is preferred that navigation and map data and/or vehicle sensor data and/or other environmental sensor data are taken into account when adjusting the first image area.

According to an advantageous further development of the invention, a second image area is determined that includes an image of a second area of the road surface.

For example, the first image area may correspond to a predicted vehicle path area in which the left vehicle wheels will roll on the road surface and the second image area may be a predicted vehicle path area in which the right vehicle wheels will roll.

The use of two image areas rather than one extended image area has the advantages of requiring less computing power and time for image processing than for just a single image area that includes both separate image areas, and of providing a higher spatial resolution for the classification of the road condition. Local changes in road conditions such as snow-free tracks on snow-covered roads, as are often seen in Scandinavia, iced over puddles or the like can be detected and taken into account more accurately when the image is split up into smaller image areas.

Three or more such image areas can be determined.

The second image area advantageously includes an image of the section of the road surface that lies further ahead. A preferred embodiment could therefore include two image areas, wherein the first image area is in the ego lane directly in front of the ego vehicle and a second image area is positioned in the same lane further ahead of the vehicle based on the vehicle speed.

The size of both image areas is preferably limited in the lateral direction by traffic lane markings or boundaries as described above.

It is preferred that the first and the second image areas do not overlap and can be spatially separate from one another. The second image area is in particular analyzed in the same way as the first image area in accordance with the steps described above. A separate second image section provides the advantage of higher spatial resolution compared to an enlarged single image section.

The position, size, and/or shape of the second image area is preferably adjusted to the speed of one's own vehicle to obtain an evenly timed prediction (or preview) of the anticipated road condition.

Advantageously, assignment of the first image area to at least one road condition from a currently taken image is checked for plausibility by assigning the second image area to at least one road condition from a previously taken image. Information is therefore output about at least one plausibility checked road condition. Since the second image area includes an image of a section of the road surface that lies further ahead, its classification practically provides a preview. In a later image, the area of the road surface is at least partially in the first image area because the vehicle moves forward. The former class of the second image area may be taken into account as a preview for plausibility checking when the first image area that is immediately decisive for the further travel is classified. This increases the reliability of detection. The two image areas are preferably transformed upon one another using odometry data of the vehicle.

In a preferred embodiment, assignment of the second image area to at least one road condition from a currently or previously taken image is merged with the assignment of the first image area to at least one road condition from the currently taken image and information about the merged road condition is output.

Advantageously, a monocular camera is used as the camera. Mono cameras are established as driver assistance cameras and are more cost efficient than stereo cameras. The method according to the invention allows robust and reliable classification of road conditions based on mono camera images.

Alternatively, a 3D or stereo camera is used in another advantageous embodiment. 3D or stereo cameras allow the analysis of depth information from the image. In addition, the 3D position data can be used for easier harmonization of a past trajectory determination from odometry and time information with the image data or for easier inclusion of a calculated future trajectory or predicted vehicle route into the image data. Furthermore, depth information profiles can be used for classification.

The invention further relates to an apparatus for determining a road condition including a vehicle camera, an image processing unit, a classification unit, and an output unit.

The vehicle camera is configured to take at least one image of the vehicle surroundings. The image processing unit is configured to determine a first image area that includes an image of the road surface and to feed it to the classification unit. The classification unit is configured to assign the first image area to at least one class that represents a specific road condition. The output unit is configured to output information about the at least one road condition which the classification unit assigned to the first image area.

BRIEF DESCRIPTION OF THE DRAWINGS

The invention will be explained in more detail below with reference to figures and exemplary embodiments.

Wherein.

DETAILED DESCRIPTION OF EXAMPLE EMBODIMENTS OF THE INVENTION

Figure 1:
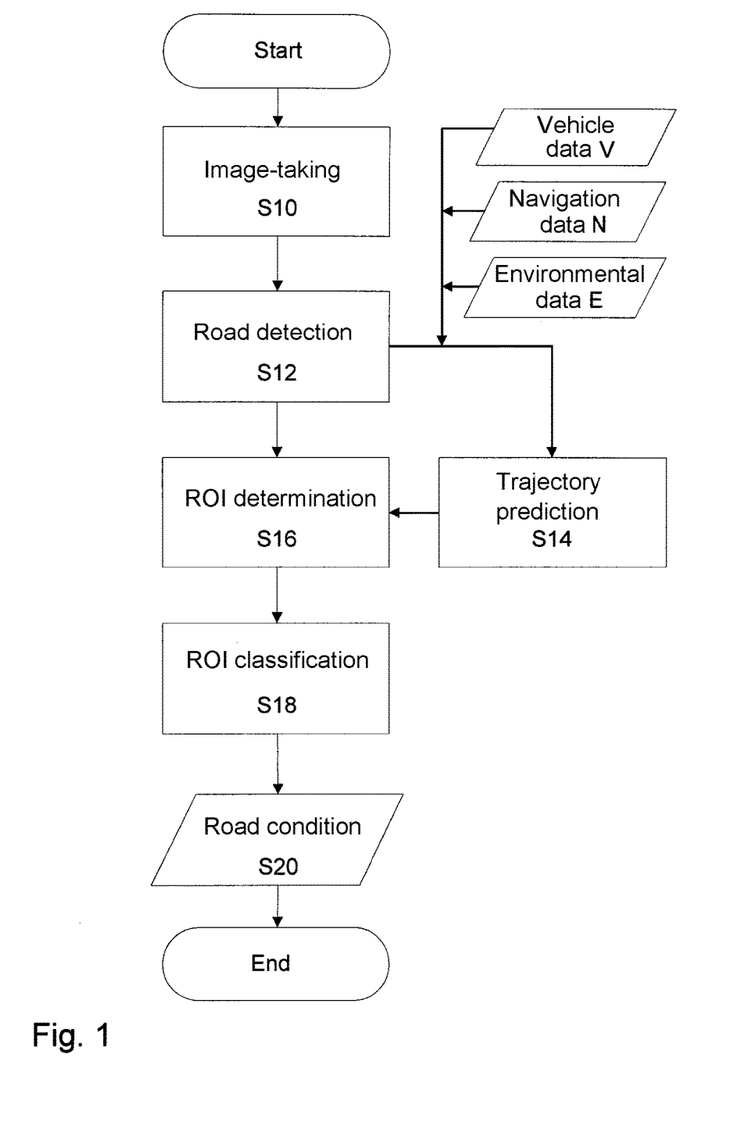
FIG. 1 is a flow chart to illustrate the flow of an embodiment of the method for determining a road condition using a vehicle camera.

FIG. 1 shows a flow chart to illustrate the flow of an embodiment of the method according to the invention for determining a road condition using a vehicle camera.

First, an image is taken using the vehicle camera in step S10. This image can be used in step S12 to detect the road, e.g. based on traffic lane markings in the image, lane boundary objects, etc. Non-stationary objects that should not be taken into account when determining the road condition may be detected as early as early as in this step.

Optionally, the trajectory or path of one's own vehicle may be predicted in step S14. Data from the vehicle's own sensors (V), e.g. steering angle, speed, etc. navigation system data or map data (N), or data from other environmental sensors such as radar, lidar, telematics unit, etc. may be taken into account here.

In step S16, the ROI or a first image area or several image areas that include(s) an image of the road surface is/are determined. This or these image section(s) or features extracted therefrom are fed to a classifier in step S18 which assigns each image area to at least one class that represents a specific road condition.

In step S20, information about this at least one road condition is output, e.g. to a collision warning system or an emergency brake assistant which can adjust its warning thresholds or intervention times to the road condition determined.

Figure 2:
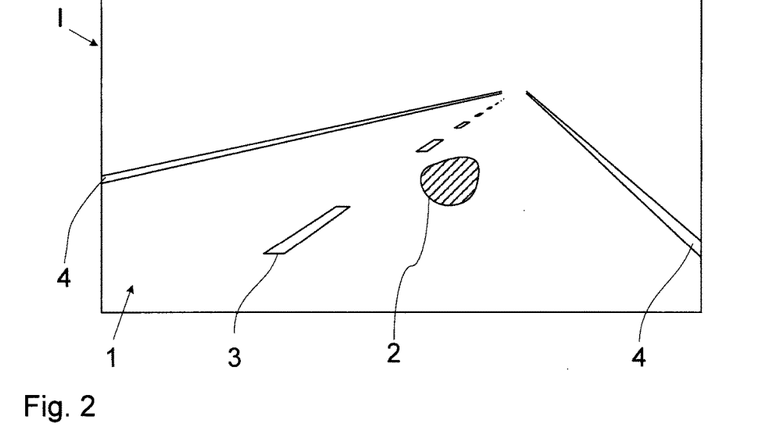
FIG. 2 is an image of a vehicle environment lying ahead that was recorded using a vehicle camera.

FIG. 2 shows an example of an image (I) of the vehicle environment lying ahead as taken from the front camera (6) of a moving vehicle. Camera-based driver assistance functionality can be implemented from the same image, e. g. a lane departure warning (LDW) function, a lane keeping assistance/system (LKA/LKS), a traffic sign recognition (TSR) function, an intelligent headlamp control (IHC) function, a forward collision warning (FCW) function, a precipitation detection function, an adaptive cruise control (ACC) function, a parking assistance function, an automatic emergency brake assist (EBA) function or emergency steering assist (ESA) function.

The camera image shows a road (1) whose surface is substantially homogeneous. Traffic lane markings are visible on the surface: one continuous sideline (4) on each side which mark the left and right end of the road and median strip segments (3) of the broken or dashed road marking. The road (1) could be formed of asphalt or concrete. A puddle (2) is visible on the otherwise dry road (1).

Figure 3:
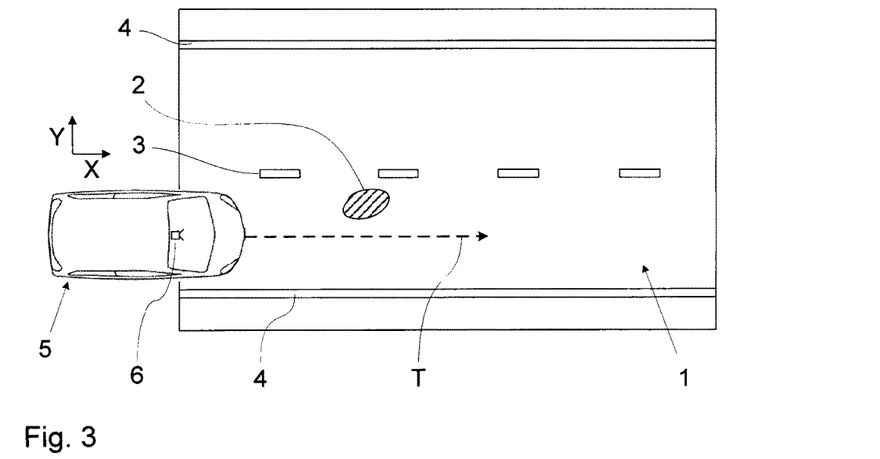
FIG. 3 is a representation of the scene depicted by the image from a bird's-eye view.

FIG. 3 is a representation of the scene depicted by the image of the vehicle camera in FIG. 2 from a bird's-eye view. This representation can be determined from the camera image, wherein, if a mono camera is used, imaging properties of the camera (4), the installation geometry of the camera in the vehicle (5), the actual vehicle height (due to tire position/chassis control), pitch angle, yaw angle, and/or roll angle are preferably considered. It may be assumed that the road surface is even.

When a 3D or stereo camera is used, the representation can be determined immediately from the captured 3D image data, wherein other aspects may be taken into consideration as well.

The representation is generally characterized in that the distances correspond to actual distances. The median strip segments are disposed equally spaced on the real road.

In the representation shown in FIG. 3, the road (1), the puddle (2), the median segments (3), and the continuous lateral boundaries (4) of the road marking that are already contained in the camera image (FIG. 2) are visible. In addition, the representation contains a vehicle (5) with a camera (6), and said camera (6) was used to take the image from FIG. 2. FIG. 3 shows a coordinate system in which the X direction corresponds to the longitudinal direction of the vehicle and the Y direction corresponds to the transverse direction of the vehicle. Vehicle or real space coordinates are labeled with uppercase letters.

The dashed arrow indicates the predicted trajectory (T) of the vehicle (5). For this driving straight ahead, the distance traveled s along the trajectory (T) in the X direction can be determined in the case of uniform motion based on the velocity v taking into account the information about the time t from s=vt. It could be determined in this way based on odometry and time information when, for example, the left front wheel of the vehicle (5) will reach the puddle (2).

Figure 4:
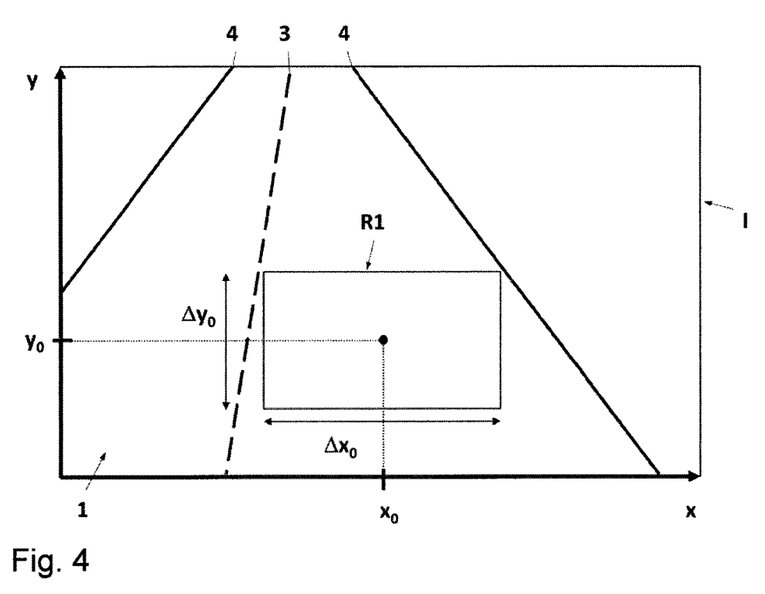
FIG. 4 is an image with a first image area.

Determination of the Region of Interest (ROI) of a Given Camera Image Depending on the Respective Driving Situation Starting from a given camera image (I), we will hereinafter call that image area the region of interest (ROI) that contains the highest information density with respect to the road condition for specific downstream functionalities (ACC, road condition estimator, etc.) FIG. 4 shows such an image area (R1) within the camera image (I).

The center of a first image area (R1) assumed to be a rectangle is described by the image coordinates $(x_0, y_0)$ and the dimension of $(\Delta x_0, \Delta y_0)$ in the entire camera image (I). Image coordinates are labeled with lowercase letters. It is possible to increase the information content for downstream control systems through proper adjustment of the first image area (R1) to the respective driving condition of the ego vehicle (5).

Figure 5:
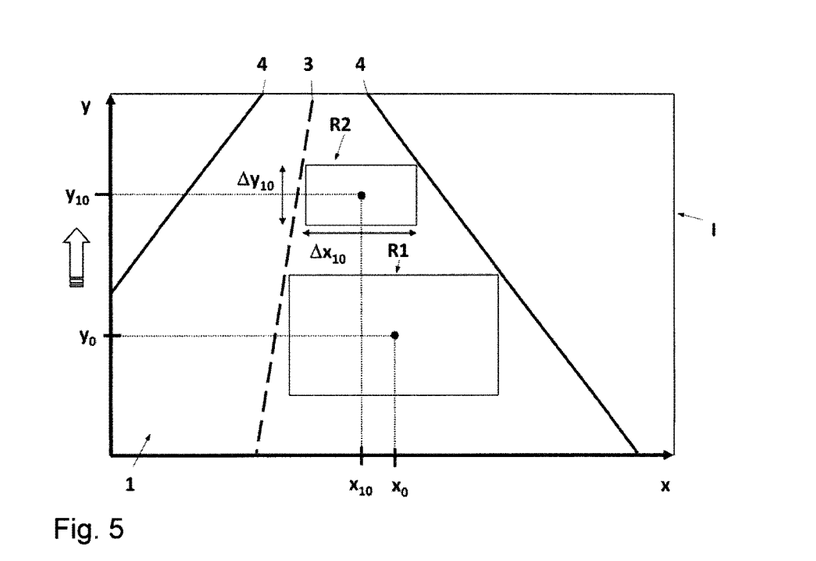
FIG. 5 is an image with a first image area and a second image area offset from it.
Figure 7:
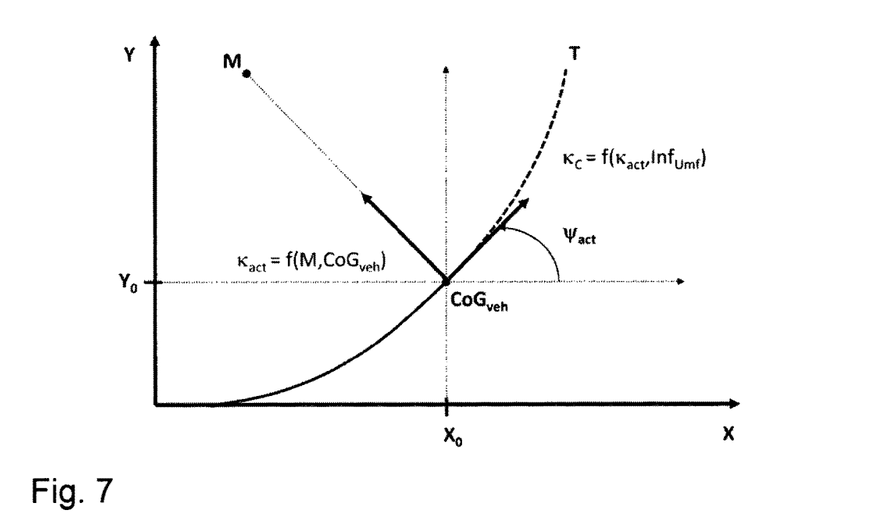
FIG. 7 is the current and future course of a trajectory while driving along a bend.

FIGS. 5 and 7 show a second image area (R2) in addition to the first image area (R1). This can be analyzed simultaneously with the first image area (R1) (that is, for a single image (I) to be analyzed). The first image area (R1) contains information about the road condition that is reached by the vehicle (5) in a shorter period of time, and the second image area (R2) contains information that will become relevant at a later time (preview for the current first image area).

Alternatively, the second image area (R2) can illustrate an adjustment of the first image area (R1) to a faster vehicle speed (or other changed driving situations).

As an example of such an adjustment of the first image area (R1), we use an adjustment based on the vehicle's own speed, the course of the traffic lane while driving through a bend, and the predicted vehicle path in an avoiding maneuver.

1. Adjustment of the First Image Area (R1) to the Speed of One's Own Vehicle (Driving Straight Ahead)

In the drive straight ahead shown in FIG. 5, the first image area (R1) could for example indicate the section of the road (1) that the vehicle travels in is at a speed of 50 km/h. If the vehicle goes twice as fast, the area of the road (1) that the second image area (R2) depicts would be passed over in one second. As the vehicle speed increases, the ROI (R2) moves further into the upper portion of the image (farther away from the vehicle (5)) and slightly to the left due to the camera perspective $(x_{10} < x_0, y_{10} > y_0)$ while its dimensions get smaller $(\Delta x_{10} < \Delta x_0, \Delta y_{10} < \Delta y_0)$.

Figure 6:
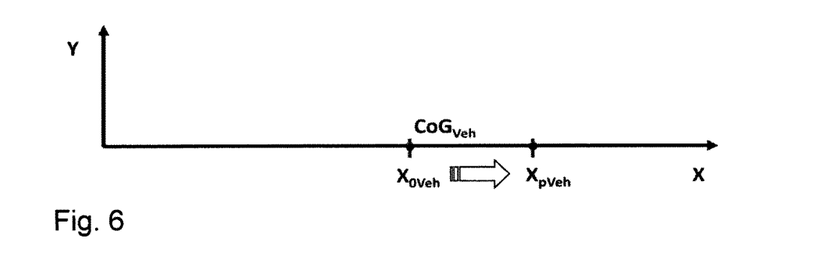
FIG. 6 is a representation for determining a predictive adaptation horizon.

FIG. 6 illustrates the determination of this adjustment using a representation in the vehicle coordinate system (X, Y). From the point of view of one's own vehicle (5) whose center of gravity CoG$_{Veh}$ is at a current position X$_{0Veh}$, a predictive adaptation horizon determined which is a function of the vehicle speed V$_{Veh}$ and optionally of other environmental information Inf$_{Umf}$:

$$X_{pVeh} = f(v_{Veh}, Inf_{Umf})$$

When the vehicle (5) moves straight ahead, the predictive adaptation horizon X$_{pVeh}$ is moved in the positive X direction relative to the actual vehicle position X$_{0Veh}$ since the vehicle moves in its longitudinal direction (see FIG.).

The environmental information Inf$_{Umf}$ could for example indicate that an image area (R1, R2) should be adjusted further such that a vehicle moving in front (not shown) is not depicted in this image area. This could result in a faulty classification of the road condition. To prevent this, an image area (R1, R2) should be reduced, cropped, or moved in this situation such that it only depicts the road surface (1, 2) to be classified.

A suitable algorithm then performs the transformation of the determined prediction horizon (X$_{pVeh}$) into the image coordinate system (x, y) to determine the new position (x$_{10}$, y$_{10}$) and dimensions (Δx$_{10}$, Δy$_{10}$) of the adjusted or changed image area. The transformation corresponds to the transition from a representation as in FIG. 3 to a representation as in FIG. 2.

2. Adjustment of the First Image Area (R1) to a Course of Traffic Lane Lying Ahead (in this Example, Passing Through a Bend)

Traffic lane markings (3, 4) can be detected from an image (I) of the vehicle camera (6) and for example used for the lane departure warning function (LDW). If the course of the traffic lane markings (3, 4) is known, the course of the traffic lane the vehicle (5) moves in can be determined.

FIG. 7 shows the current and predicted trajectory (T) as determined by a traffic lane detection function in the vehicle coordinate system while passing through a bend. The mean curvature κ$_C$ of the predicted trajectory (dashed line T) can be indicated as a function of the actual vehicle yaw movement κ$_{act}$ of the current trajectory (continuous line T) and of additional environmental information, in particular of the curvature of the course of traffic lane lying ahead.

$$\kappa_C = f\left(\kappa_{act} = \frac{\dot{\Psi}_{Veh}}{v_{Veh}}, Inf_{Umf}\right)$$

Figure 8:
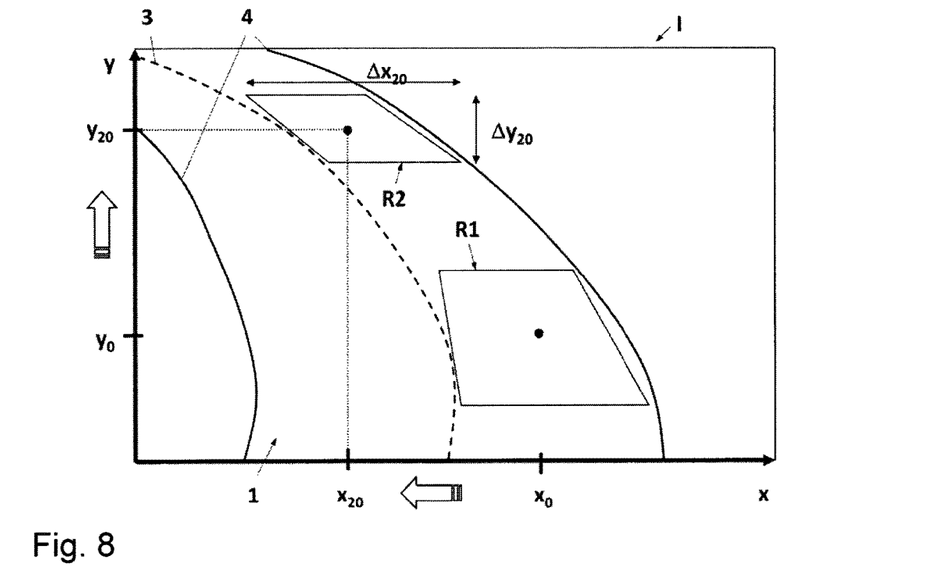
FIG. 8 is an image with a first image area and an image area offset from it taking into account the course of the traffic lane.

FIG. 8 shows for right-hand traffic how a prediction horizon determined from FIG. 7 (not shown there) can be transformed in the image (I) by adjusting the image area from R1 to R2. In the left-hand bend shown here, the ROI moves into the top left camera image corner (x$_{20}$<x$_0$, y$_{20}$>y$_0$). The area of the image area diminished in accordance with the camera image. A trapezoid shape positioned on the road between the median (3) and the right-hand traffic lane boundary line (4) was selected for the two depicted image areas (R1, R2).

3. Adjustment of the First Image Area (R1) to a Predicted Vehicle Path in an Avoiding Maneuver The vehicle path is the predicted corridor of movement of the ego vehicle (5) up to about 150 m distance. It is in particular characterized by its width, which may match the width of the traffic lane. The vehicle path can be calculated from camera data and data of other environmental or vehicle sensors.

If the respective camera and environmental sensors and monitoring of the driver's activities warrant an avoiding maneuver, the area of the road surface (1) to be depicted by the ROI is moved based on an optimally planned avoiding trajectory (e.g. of the second order).

$$Y = f(X) = \begin{cases} \frac{2 \cdot S_Y}{S_X^2} \cdot x^2, & X \le \frac{S_X}{2} \\ -S_Y + \frac{4 S_Y}{S_X} \cdot X - \frac{2 \cdot S_Y}{S_X^2} \cdot X^2, & X > \frac{S_X}{2} \end{cases}$$

The required lateral vehicle offset is labeled S$_Y$, the available avoidance space in the X direction is S$_X$. The curvature of the optimum avoidance curve κ$_{ref}$ is derived from the planned avoiding trajectory according to:

$$\kappa_{ref}(X) = \frac{1}{R} = \left| \frac{f''(X)}{(1 + f'(X)^2)^{\frac{3}{2}}} \right|$$

The currently driven curvature κ$_{act}$ is a function of the vehicle yaw (see Section 2). The prediction horizon X$_{pVeh}$ is a measure of the "forward planning" with which individual points (X$_{pVeh}$, Y$_{pVeh}$) of the optimum avoidance curve become the target image coordinates (x$_{30}$, y$_{30}$) for the ROI.

Figure 9:
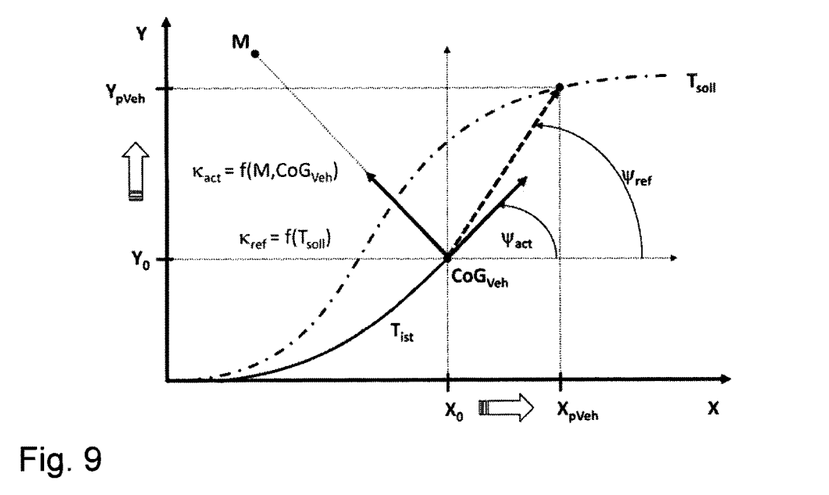
FIG. 9 is a comparison of the current ACTUAL and the calculated PLANNED trajectory in an avoiding maneuver.

FIG. 9 shows a previous trajectory T$_{ist}$ in the vehicle coordinate system that would result in a collision with an obstacle (7) if it were continued. An optimum avoiding trajectory T$_{soll}$ is shown as a dashed-dotted line. It could have been used to circumvent the obstacle comfortably. During an emergency maneuver, a trajectory as shown in the dashed-dotted line may be required due to a short-term change in yaw angle from Ψ$_{act}$ to Ψ$_{ref}$ to enter the range of the planned trajectory as effectively as possible.

In such an emergency maneuver, however, determining the road condition or camera-based estimation of the friction coefficient is extremely important since the brake and steering system brakes or steers up to the limit of the friction coefficient. A puddle (2) on an otherwise dry road (1) as shown in FIG. 2 could mean that a collision with the obstacle cannot be avoided or that one's own vehicle leaves the road.

Figure 10:
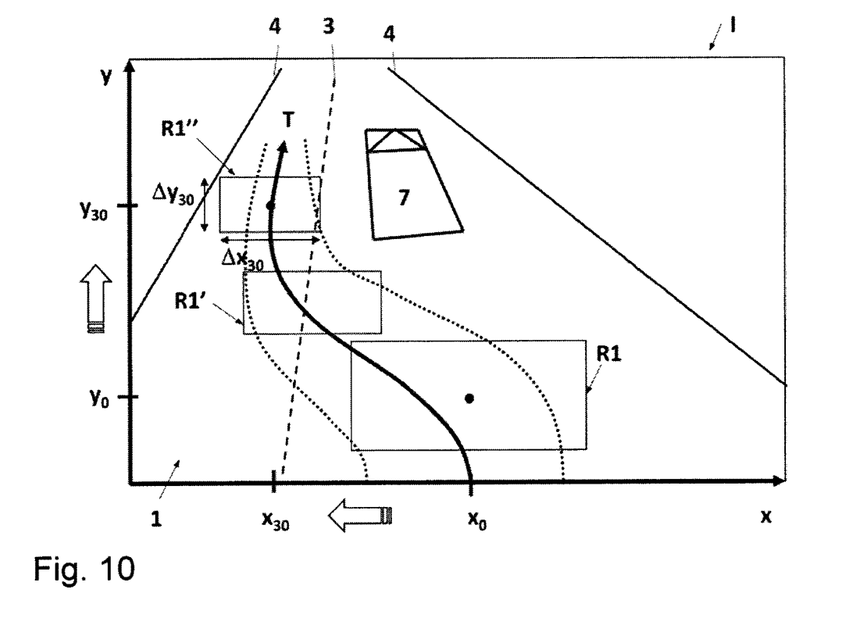
FIG. 10 is an image with a first image area and two image areas offset from it taking into account the predicted vehicle path.

FIG. 10 shows a camera image (I) depicting a stationary obstacle (7), e.g. a vehicle, in the traffic lane used by the ego vehicle (6). It shows in addition to the calculated vehicle path (or corridor of movement) T with the continuous median trajectory and the dotted sidelines for an avoiding maneuver how a prediction horizon X$_{pVeh}$, Y$_{pVeh}$ determined from FIG. 9 can be transformed in the image (I) by adjusting the image area from R1 to R1". An intermediate step of the adjustment (R1') is also shown.

In the case shown (avoidance to the left), the position and adjustment of the first image area R1' to R1" after appropriate transformation of the movement variables (X,Y) into the image coordinate system (x,y) results in a rectangular image area R1" at position (x$_{30}$<x$_0$, y$_{30}$>y$_0$) with the dimensions (Δx$_{30}$, Δy$_{30}$). This would ensure that a change in road condition or friction coefficient would be detected or reliably estimated and taken into account when performing the emergency maneuver.

LIST OF REFERENCE SYMBOLS

1 Road or road surface
2 Puddle
3 median line segment
4 continuous traffic lane boundary line
5 (own) vehicle
6 Vehicle camera
7 Obstacle
S10 Image-taking
S12 Road detection
S14 Trajectory planning
S16 ROI determination
S18 ROI classification
S20 Output of the road condition
V Vehicle sensor data
N Navigation/map data
E Environmental sensor data
I Image
T Trajectory (of movement)
X Longitudinal vehicle coordinate
Y Transverse vehicle coordinate
x,y Image coordinates
R1 First image area/ROI
R2 Second or adjusted image area/ROI
$CoG_{Veh}$ Center of gravity of the vehicle
$X_{0Veh}, Y_{0Veh}$ Current X position or Y position of the vehicle
$X_{pVeh}, Y_{pVeh}$ Position of the predictive adaptation horizon
$v_{Veh}$ Vehicle speed
$Inf_{Umf}$ Environmental information
M Center of the curve circle
$\kappa_{act}$ Actual curvature
$\kappa_C$ Predicted curvature
$\Psi_{act}$ Actual yaw angle
$\Psi_{Veh}$ Actual yaw rate
$T_{ist}$ Actual trajectory
$T_{soll}$ Planned trajectory
$\kappa_{ref}$ Curvature of the planned trajectory
$\Psi_{ref}$ Yaw angle that results in the planned trajectory

The invention claimed is:

1. A method of determining a road condition of a road surface of a road on which a subject vehicle is traveling, comprising:
    with a camera of the subject vehicle, acquiring successive camera images including the road surface, wherein the successive camera images include an earlier image acquired at an earlier time and a later image acquired at a later time after the earlier time;
    in the later image, determining a first image area including a first surface area on the road surface;
    in the earlier image, determining a second image area including a second surface area on the road surface;
    performing image processing including classification of the first image area in the later image to classify the first surface area on the road surface at the later time into a first class among plural pre-determined classes respectively representing different road conditions;
    performing image processing including classification of the second image area in the earlier image to classify the second surface area on the road surface at the earlier time into a second class among the plural pre-determined classes respectively representing different road conditions;
    performing merging or plausibility-checking, wherein the merging comprises merging the classification of the first surface area on the road surface at the later time in the first class with the classification of the second surface area on the road surface at the earlier time in the second class to produce merged information regarding the road condition, and wherein the plausibility-checking comprises checking a plausibility of the classification of the first surface area on the road surface at the later time in the first class relative to the classification of the second surface area on the road surface at the earlier time in the second class to produce plausibility-checked information regarding the road condition; and
    outputting the merged information or the plausibility-checked information as output information.

2. The method according to claim 1, wherein the first image area and the second image area do not overlap with one another.

3. The method according to claim 1, wherein the second image area covers a section of the road surface that lies farther ahead of the subject vehicle than a section of the road surface covered by the first image area.

4. The method according to claim 1, wherein the second surface area on the road surface at the earlier time corresponds at least partially with the first surface area on the road surface at the later time as the subject vehicle travels along the road, so that the classification of the second surface area at the earlier time provides an expected preview of the classification of the first surface area at the later time.

5. The method according to claim 4, wherein a correspondence of the second surface area on the road surface at the earlier time with the first surface area on the road surface at the later time is achieved using odometry data of the subject vehicle traveling along the road.

6. The method according to claim 1, comprising the performing of the plausibility-checking, and the outputting of the plausibility-checked information.

7. The method according to claim 6, wherein in the plausibility-checking,
    when the first class corresponds with the second class then producing the plausibility-checked information to indicate that the road condition is classified in the second class, and
    when the first class differs from the second class then determining a probability value for the first class from the classification of the first surface area on the road surface at the later time, comparing the probability value to a threshold value, and producing the plausibility-checked information to indicate that the road condition is classified in the first class when the probability value exceeds the threshold value or to indicate that the road condition is classified in the second class when the probability value does not exceed the threshold value.

8. The method according to claim 6, wherein the plausibility-checked information indicates that the road condition is classified in the first class unless the plausibility-checking determines that the first class is an implausible outlier.

9. The method according to claim 1, comprising the performing of the merging, and the outputting of the merged information.

10. The method according to claim 1, further comprising determining a coefficient of friction of the first surface area on the road surface based on at least the output information.

11. The method according to claim 1, wherein the plural pre-determined classes include four classes representing the road surface condition respectively as wet, dry, snow-covered and icy.

12. The method according to claim 1, wherein the successive camera images further include plural successive images acquired at successive times before the later time, and wherein the method further comprises respectively classifying the first image area in the plural successive images to classify the first surface area on the road surface at the successive times respectively into one or more of the plural pre-determined classes, and performing temporal filtering on the classifications of the first surface area on the road surface at the successive times and at the later time before performing the merging or the plausibility-checking.

13. The method according to claim 12,
wherein the temporal filtering comprises comparing with one another the respective classifications of the first surface area at at least one of the successive times and at the later time,
when the classification of the first surface area at the later time corresponds to the classification of the first surface area at the at least one successive time then performing the merging or the plausibility-checking on the classification of the first surface area at the later time, and
when the classification of the first surface area at the later time differs from the classification of the first surface area at the at least one successive time then determining a probability value for the first class from the classification of the first surface area at the later time, and performing the merging or the plausibility-checking on the classification of the first surface area at the later time when the probability value exceeds a threshold value or performing the merging or the plausibility-checking on the classification of the first surface area at the at least one successive time when the probability value does not exceed the threshold value.

14. The method according to claim 1, wherein the camera is a mono camera.

15. The method according to claim 1, wherein the camera is a stereo camera.

16. An apparatus for performing the method according to claim 1 for determining the road condition of the road surface, wherein said apparatus comprises:
the camera configured to perform the acquiring of the successive camera images;
an image processor configured to perform the determining of the first and second image areas, the classification of the first and second image areas, and the merging or the plausibility-checking; and
an output unit configured to perform the outputting of the merged information or the plausibility-checked information.

17. A method of determining a road condition using a vehicle camera of a subject vehicle, comprising:
acquiring plural images with the vehicle camera;
determining, in the images, a first image area that includes an image of a road surface;
providing the first image area to a classifier, and with the classifier assigning the first image area to at least a first road condition class among plural road condition classes that respectively represent different road conditions;
determining, in the images, a second image area that includes an image of a section of the road surface that lies farther ahead than the first image area;
providing the second image area to the classifier, and with the classifier assigning the second image area to at least a second road condition class among the plural road condition classes;
checking a plausibility of the assignment of the first image area of a currently acquired one of the images to at least the first road condition class, relative to the assignment of the second image area of a previously acquired one of the images to at least the second road condition class; and
outputting information regarding at least one plausibility-checked road condition based on a result of the checking of the plausibility.

18. The method according to claim 17, wherein the first and second image areas do not overlap one another in any one of the plural images.

19. A method of determining a road condition using a vehicle camera of a subject vehicle, comprising:
acquiring plural images with the vehicle camera;
determining, in the images, a first image area that includes an image of a road surface;
providing the first image area to a classifier, and with the classifier assigning the first image area to at least a first road condition class among plural road condition classes that respectively represent different road conditions;
determining, in the images, a second image area that includes an image of a section of the road surface that lies farther ahead than the first image area;
providing the second image area to the classifier, and with the classifier assigning the second image area to at least a second road condition class among the plural road condition classes;
merging the assignment of the first image area of a currently acquired one of the images to at least the first road condition class, with the assignment of the second image area of a previously acquired one of the images to at least the second road condition class; and
outputting information regarding at least one merged road condition based on a result of the merging.

20. The method according to claim 19, wherein the first and second image areas do not overlap one another in any one of the plural images.

* * * * *

UNITED STATES PATENT AND TRADEMARK OFFICE
CERTIFICATE OF CORRECTION

PATENT NO. : 10,147,002 B2  
APPLICATION NO. : 14/764782  
DATED : December 4, 2018  
INVENTOR(S) : Hartmann et al.

Page 1 of 1

It is certified that error appears in the above-identified patent and that said Letters Patent is hereby corrected as shown below:

On the Title Page

Page 2,  
Item [56], OTHER PUBLICATIONS,  
Line 24, after "Oct. 2, 2012", replace "X2035120063" with --XP035120063--;

In the Specification

Column 10,  
Line 60, after "travels in", replace "is" with --1s--;

Column 11,  
Line 5, after "horizon", insert --$X_{pVeh}$ is--;  
Line 14, after "direction", replace "(see FIG.)" with --(see FIG. 3)--;

Column 12,  
Lines 10 to 15, in the formula replace two occurrences of "$S^2_x$" with --$S_x^2$--.

Signed and Sealed this  
Thirty-first Day of March, 2020

Andrei Iancu  
*Director of the United States Patent and Trademark Office*